J. DLESK.
DUSTPROOF BALL BEARING.
APPLICATION FILED APR. 12, 1920.
1,420,416. Patented June 20, 1922.
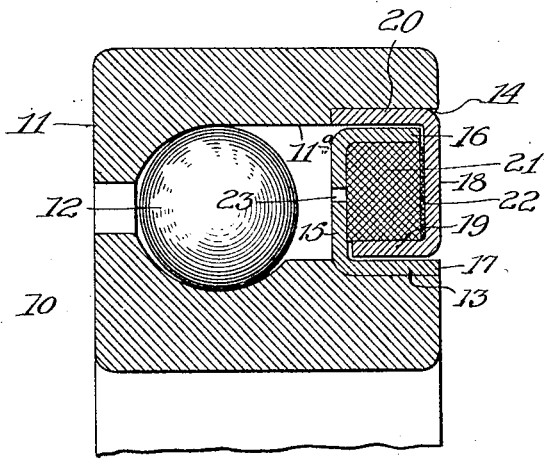
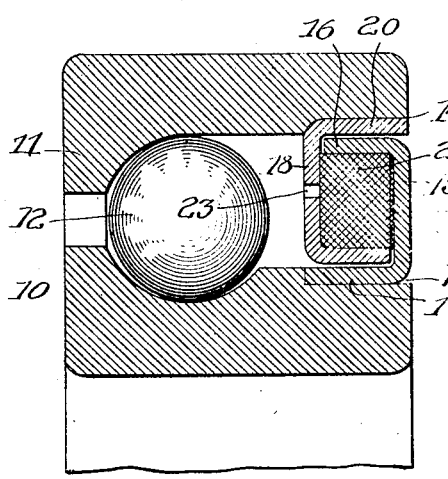
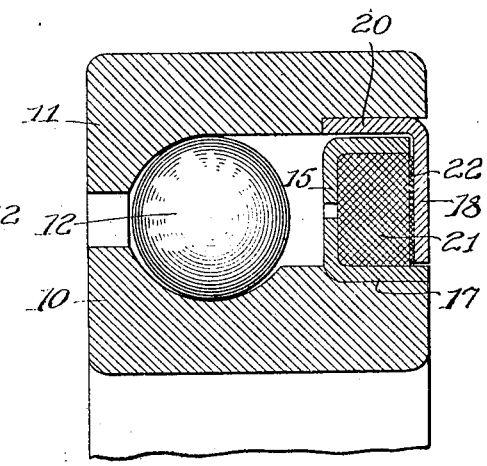
Inventor:
John Dlesk

UNITED STATES PATENT OFFICE.

JOHN DLESK, OF BERWYN, ILLINOIS, ASSIGNOR TO U. S. BALL BEARING MANUFACTURING COMPANY, OF CHICAGO, ILLINOIS, A CORPORATION OF ILLINOIS.

DUSTPROOF BALL BEARING.

1,420,416.    Specification of Letters Patent.    Patented June 20, 1922.

Application filed April 12, 1920. Serial No. 373,173.

*To all whom it may concern:*

Be it known that I, JOHN DLESK, a citizen of the United States, residing at Berwyn, in the county of Cook and State of Illinois, have invented a new and useful Improvement in Dustproof Ball Bearings, of which the following is a specification.

This invention relates to dust proof ball bearings and is fully described in the following specification and shown in the drawings, in which—

Figure 1 is a partial transverse section through a bearing embodying this invention.

Figures 2 and 3 are similar views of modified forms of the invention.

The forms illustrated are shown in connection with a ball bearing having an annular raceway 10 and an outer raceway 11 between which are placed a series of balls 12. One of these raceways is preferably interrupted, as at 11ª, throughout the entire circumference in order to facilitate the assembling and dis-assembling of the bearings. Both the inner and the outer raceways are extended upon this open side so as to permit of the formation of the counter-bores 13 and 14, respectively.

An annular cup-shaped member having a bottom 15 and outer and inner cylindrical sides 16 and 17, respectively, is placed, as is shown in Figure 1, with the inner cylindrical surface 17 fitting snugly over the inner counter-bore 13 so as to retain the cup-shaped member thereon. A similar, but somewhat larger cup-shaped member having a bottom 18 and cylindrical sides 19 and 20 is secured to the outer race-way by being driven into the counter-bore 14.

These two cup-shaped members face each other and form an annular passage therebetween in which is placed a felt ring 21, or the like, and a washer 22.

It will be understood from the foregoing that the cup-shaped members 15 and 18 will turn with the inner and outer raceways, respectively, and that the felt ring 21 will turn with the inner race-way. Owing to the fact that the friction between the felt ring 21 and the washer 22 is greater than that between the washer and the inner surface of the cup-shaped member 18, the washer will turn with the felt ring. This washer may be made of any suitable wear-resisting material, such as metal or composition. In this way, wear of the felt ring is substantially prevented.

Some oil will find its way around and into the felt ring between the cylindrical surfaces 16 and 20. A series of oil holes 23 is also provided for this purpose.

The cylindrical surfaces 17 and 20 are tightly fitted into their counter-bores so as to form a dirt and oil-proof joint. It will also be readily understood that from the character of the passages formed enclosing the felt ring that no dirt will be permitted to enter the bearings and that very little, if any oil, will be permitted to seep out.

In Figure 2 is illustrated a modification of the form shown in Figure 1, wherein the cup-shaped members 15 and 18 are reversed, the hole 23 being placed in this case in what is the inner member 18 of this figure.

In Figure 3 is shown another modification of Figure 1, in which the cylindrical surface 19 is omitted and which terminates at the inner edge of the bottom 18.

The bearings illustrated are of the combined radial and thrust type, but it is to be understood that the invention is not limited to bearings of this type, but could be applied to any radial or thrust bearing of this general character, whether employing balls or rollers as anti-friction members, provided the races are concentric as shown.

While I have shown and described but a single embodiment of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. In a bearing, an outer race-way, an inner race-way, anti-friction members therebetween, an annular cup-shaped member secured to one race-way and a smaller annular cup shaped member secured to the other race-way, said members being turned to face each other and one lying partially within the other.

2. In a bearing, an outer race-way, an inner race-way, anti-friction members therebetween, an annular cup-shaped member secured to one race-way and a smaller annular cup shaped member secured to the other race-way, said members being turned to face each other and each lying partially within the other.

3. In a bearing, an outer race-way, an inner race-way, anti-friction members therebetween, an annular cup-shaped member secured to one race-way and a smaller annular cup shaped member secured to the other race-way, said members being turned to face each other, one lying partially within the other and a felt ring lying between said members.

4. In a bearing, an outer race-way, an inner race-way, anti-friction members therebetween, an annular cup-shaped member secured to one race-way and a smaller annular cup shaped member secured to the other race-way, said members being turned to face each other, one lying partially within the other, a felt ring lying between said members and a washer between said felt ring and one of said cup-shaped members.

5. In a bearing, an outer race-way, an inner race-way, anti-friction members therebetween, an annular cup shaped member secured to one race-way, a felt ring in said member and a cover secured to the other race-way and overlying said felt ring.

6. In a bearing, an outer race-way, an inner race-way, anti-friction members therebetween, an annular cup shaped member secured to one race-way, a felt ring in said member, a cover secured to the other race-way and overlying said felt ring and a washer between said felt ring and cover.

7. In a bearing, an outer race-way, an inner race-way, anti-friction members therebetween and means secured to said race-way for excluding dust therefrom, said race-ways being counter-bored, said means including relatively movable members, one of which is cupped and forced into one counter-bore, another of which is forced into the other counter-bore and a felt washer retained within said cupped member and bearing upon the other member.

8. In combination with a ball bearing, a retainer for packing means comprising flanged members insertable between the race rings of the bearing, said retainer having annular seats for said packing means between the contiguous surfaces of the flanged members.

9. An oil retainer situated wholly between the two race rings of a ball bearing, said retainer comprised of flanged rings having relative rotation with respect to each other and packing material between the oppositely extending surfaces of the said rings.

10. An oil retainer for anti-friction bearings, comprising elements applicable in oppositely extending direction to rings of the bearing, and a packing medium to be embraced between the said elements, the elements constructed and arranged to maintain a tight running joint and allow for lateral and radial movement relatively of the bearing rings.

11. A packing unit comprising a pair of relatively movable substantially flat rings of approximately equal diameter embracing a flat packing medium, the whole adapted to be mounted between the rings of a ball bearing.

JOHN DLESK.